United States Patent [19]
Khanin et al.

[11] Patent Number: 5,932,691
[45] Date of Patent: Aug. 3, 1999

[54] PROCESS FOR DEVOLATILIZATION

[75] Inventors: David Khanin, Piscataway; Leonard Sebastian Scarola, Union, both of N.J.

[73] Assignee: Union Carbide Chemicals & Plastics Technology Corporation, Danbury, Conn.

[21] Appl. No.: 08/985,796

[22] Filed: Dec. 5, 1997

[51] Int. Cl.⁶ ....................................................... C08F 6/00

[52] U.S. Cl. ........................... 528/483; 528/492; 528/501; 528/502 R; 528/503; 264/102; 264/345

[58] Field of Search ...................................... 528/483, 492, 528/501, 502 R, 503; 264/102, 345; 521/79

[56] References Cited

U.S. PATENT DOCUMENTS

| | | | |
|---|---|---|---|
| 3,975,473 | 8/1976 | Mulvaney | 264/23 |
| 4,169,679 | 10/1979 | Miller et al. | 366/76 |
| 4,302,409 | 11/1981 | Miller et al. | 264/45.9 |
| 5,442,041 | 8/1995 | Mallikarjun et al. | 528/483 |
| 5,639,801 | 6/1997 | Mallikarjun et al. | 528/483 |

*Primary Examiner*—Fred Teskin
*Attorney, Agent, or Firm*—Saul R. Bresch

[57] ABSTRACT

A process for the devolatilization of a thermoplastic polymer containing gaseous impurities in an apparatus having a melting zone, a mixing zone, and a reduced pressure zone, comprising:

(a) (i) adding a granular blowing agent directly or via a masterbatch to the polymer prior to the introduction of the polymer into the melting zone, said blowing agent being added in an amount of about 1 to about 4 percent by weight based on the weight of the polymer or (ii) adding a gaseous blowing agent to the mixing zone;

(b) melting the polymer in the melting zone;

(c) mixing the molten polymer and blowing agent in the mixing zone under sufficient pressure to maintain the blowing agent in the mixture;

(d) at a temperature sufficient for decomposition or expansion, (i) decomposing the granular blowing agent in the mixing zone and/or in the reduced pressure zone or (ii) expanding the gaseous blowing agent in the reduced pressure zone wherein the blowing agent in its decomposed or expanded state develops froth cells in the molten polymer;

(e) in the reduced pressure zone, reducing the pressure at the surface of the molten polymer in a sufficient amount to remove essentially all of the gaseous impurities;

(f) optionally, repeating steps (c), (d), and (e) at least once; and (g) recovering the polymer in an essentially unfoamed state.

6 Claims, No Drawings

PROCESS FOR DEVOLATILIZATION

TECHNICAL FIELD

This invention relates to a process for devolatilization for the purpose of removing gaseous impurities from thermoplastic polymers.

BACKGROUND INFORMATION

Processes for the manufacture of plastic products are generally accompanied by gas generation in the polymer melt. These gases cause significant problems in both processing and the quality of the final product through the generation of voids, bubbles, and/or odor. In many cases, the voids and bubbles reduce the strength of the plastic product, and, at the very least, have a detrimental effect on its appearance. Further, plastic food containers with any trace of chemical odor are not acceptable.

Whereas the removal of volatiles during polymer manufacture is an indispensable operation, devolatilization during subsequent processing stages is an additional, often very expensive, task. However, residual amounts of unreacted monomer(s), low molecular weight reaction products, solvents and other diluents, processing aids, decomposition products, and entrapped air or inert gases have to be removed. Flash vaporization, thin film vaporization, and screw devolatilization are the basic methods used to remove these impurities, and various screw designs, vacuum systems, additives, and steam or water injection are used to enhance these methods.

A process combining water injection with vacuum devolatilization is particularly effective for removing impurities having a high diffusion velocity in the resin melt.

It is another matter, however, if the impurities have a very low diffusion velocity in the resin melt. In this case, the thickness of the molten resin does not allow the impurities to leave the resin even during a long residence time. For example, reduction of the limonene content in high density polyethylene recycle is not successful in such a process. Increasing melt temperature, the number of vacuum ports, and adding more water only results in foaming with an insignificant reduction in limonene content. A similar result occurs in a like effort to eliminate odor in polypropylene.

DISCLOSURE OF THE INVENTION

An object of this invention, therefore, is to provide a process for the reduction or elimination of gaseous impurities in or from resin melts in which the gaseous impurities have a very low diffusion velocity. Other objects and advantages will become apparent hereinafter.

According to the present invention such a process has been discovered. The process is one for the devolatilization of a thermoplastic polymer containing gaseous impurities in an apparatus having a melting zone, a mixing zone, and a reduced pressure zone, and comprises.

(a) (i) adding a granular blowing agent directly or via a masterbatch to the polymer prior to the introduction of the polymer into the melting zone, said blowing agent being added in an amount of about 1 to about 4 percent by weight based on the weight of the polymer or (ii) adding a gaseous blowing agent to the mixing zone;

(b) melting the polymer in the melting zone;

(c) mixing the molten polymer and blowing agent in the mixing zone under sufficient pressure to maintain the blowing agent in the mixture;

(d) at a temperature sufficient for decomposition or expansion, (i) decomposing the granular blowing agent in the mixing zone and/or in the reduced pressure zone or (ii) expanding the gaseous blowing agent in the reduced pressure zone wherein the blowing agent in its decomposed or expanded state develops froth cells in the molten polymer;

(e) in the reduced pressure zone, reducing the pressure at the surface of the molten polymer in a sufficient amount to remove essentially all of the gaseous impurities;

(f) optionally, repeating steps (c) and (d) at least once; and (g) recovering the polymer in an essentially unfoamed state.

DESCRIPTION OF THE PREFERRED EMBODIMENT(S)

The process concerns devolatilization in an apparatus having a melting zone, a mixing zone, and a reduced pressure (or vacuum) zone. This can be accomplished in an extruder, which is used as a melt mixer. Melt mixing, preferably continuous, can be accomplished in various types of extruders, some of which are described in U. S. Pat. Nos. 4,814,135; 4,85,7,600; 5,076,988; and 5,153,382. All types of single screw and twin screw extruders and polymer melt pumps will generally be suitable in effecting the process of this invention as long as they are adapted for mixing and foaming. A typical extruder, commonly referred to as a fabrication extruder, will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear of the feed zone. The length to diameter ratio of each barrel is in the range of about 15:1 to about 40:1. Mixers and extruders useful in carrying out the process of the invention are conventional off-the-shelf equipment. Mixers, which can be used to carry out the process, are, for example, BANBURY™ or other internal mixers, BAKER PERKINS™ or similar sigma blade mixers, and HENSCHEL™ mixers. Examples of preferred extruders are the ZSK™ co-rotating intermeshing twin screw extruder or the KILLION™ single screw extruder, each being preferably outfitted with a pelletizing system and a vacuum system. It will be understood that the reduced pressure zone in the extruder or melter/mixer can be a vacuum, and the removal of the impurities in step (e) can be accomplished by vacuuming.

The thermoplastic resins used in this invention can be any extrudable homopolymer or copolymer produced from two or more comonomers, or a blend of two or more of these polymers. They are generally polymers conventionally used in film, sheet, tubing, and profile shapes, and as jacketing and/or insulating materials in wire and cable applications and for glass cores in fiber optics applications.

The monomers useful in the production of these homopolymers and copolymers can have 2 to 20 carbon atoms, and preferably have 2 to 12 carbon atoms. Examples of these monomers are alpha-olefins, preferably those having 2 to 8 carbon atoms, such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chlorotrifluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetrafluoroethylene. The thermoplastic resins can also include, for example, polyesters, polycarbonates, polyamides, and polyurethanes. The homopolymers and copolymers of ethylene and propylene are preferred, both in the non-halogenated and halogenated form. Included in this preferred group are terpolymers such as ethylene/propylene/diene monomer rubbers.

Examples of ethylene polymers are as follows: a high pressure homopolymer of ethylene; a copolymer of ethylene and one or more alpha-olefins having 3 to 8 carbon atoms; a homopolymer or copolymer of ethylene having a hydrolyzable silane grafted to their backbones; a homopolymer or copolymer of ethylene having a carboxylate moiety grafted to their backbones, a particularly desirable carboxylate moiety for grafting being maleic anhydride; a copolymer of ethylene and a hydrolyzable silane; or a copolymer of an alpha-olefin having 2 to 12 carbon atoms and an unsaturated ester having 4 to 20 carbon atoms, e. g., an ethylene/alkyl acrylate or vinyl acetate copolymer; an ethylene/alkyl acrylate or vinyl acetate/hydrolyzable silane terpolymer; and ethylene/alkyl acrylate or vinyl acetate copolymers having a hydrolyzable silane grafted to their backbones; a copolymer of ethylene and maleic anhydride; and a terpolymer of ethylene, an unsaturated ester having 4 to 20 carbon atoms, e. g., an ethylene/alkyl acrylate or vinyl acetate copolymer, and maleic anhydride.

The homopolymer or copolymers can be grafted with an alkenyl trialkoxy silane in the presence of an organic peroxide, which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms. The hydrolyzable polymers can be moisture cured in the presence of a silanol condensation catalyst such as dibutyl tin dilaurate, dioctyl tin maleate, stannous acetate, stannous octoate, lead naphthenate, zinc octoate, iron 2-ethyl hexoate, and other metal carboxylates.

With respect to polypropylene: homopolymers and copolymers of propylene and one or more other alpha-olefins wherein the portion of the copolymer based on propylene is at least about 60 percent by weight based on the weight of the copolymer can be used. The polypropylene can be prepared by conventional processes such as the process described in U. S. Pat. No. 4,414,132. The alpha-olefins in the copolymer are preferably those having 2 or 4 to 12 carbon atoms.

The homopolymers or copolymers of ethylene wherein ethylene is the primary comonomer and the homopolymers and copolymers of propylene wherein propylene is the primary comonomer may be referred to herein as polyethylene and polypropylene, respectively.

The granular blowing (or foaming) agents preferably have a foaming or decomposition temperature in the range of about 90 to about 220 degrees C. and are exemplified by azo-bis-isobutyronitrile, azodicarbonamide, p-toluenesulfonyl hydrazide, 4,4'-oxybis (benzenesulfonyl hydrazide), diphenylene oxide-4,4- disulfohydrazide, trihydrazinotriazine, p-toluenesulfonylsemicarbazide, 5-phenyltriazole, and isatoic anhydride. The decomposition temperatures of the granular blowing agents can be adjusted to be in the preferred range by adding accelerators such as calcium stearate, magnesium stearate, zinc stearate, glycerin, ethanolamine, urea, and zinc oxide. Additional blowing agents are mentioned in U. S. Pat. No. 3,855,378. Where two blowing agents are used, the ratio, by weight, can be in the range of about 6:1 to about 1:6, and is preferably about 3:1 to about 1:3. The blowing agents are preferably treated with chemical blowing aids. In any case, the blowing agents desirably decompose in the range of about 130 to about 200 degrees C., and generate an inert gas such as nitrogen. Their decomposition temperatures should be such that they do not decompose during steps (a) and (b) of the melt/mixing process.

Blowing agent aids useful in the present invention include salicylic acid, stearic acid, phthalic acid, zinc stearate, lead stearate, magnesium stearate, calcium stearate, ethylene glycol, glycerol, ethanolamine, urea, various urea derivatives, melanin, dibasic lead phosphite, tribasic lead sulfate, and zinc oxide. The quantity of the blowing agent aid can be about 0.0003 to about 0.6 part by weight per 1 part by weight of chemical blowing agent. The blowing agent and the blowing agent aid are blended at temperatures below the decomposition temperature of the blowing agent. The blending temperature can be in the range of about 20 to about 120 degrees C., and is preferably in the range of about 30 to about 80 degrees C.

The process of the invention comprises the following steps:

(a) (i) adding a granular blowing agent directly or via a masterbatch to the polymer preferably prior to the introduction of the polymer into the melting zone, said blowing agent being added in an amount of about 1 to about 4 percent by weight based on the weight of the polymer, and preferably being added in an amount of about 2 to about 3.5 percent by weight (the granular blowing agent can also be added directly to the melting zone); or (ii) adding a gaseous blowing agent to the mixing zone. The gaseous blowing agents are preferably added under a pressure, which exceeds the melt pressure in the mixing zone by about 10 to about 100 percent, preferably about 20 to about 50 percent. The melt pressure in the mixing zone can be in the range of about 150 to about 4000 psia, and is preferably in the range of about 300 to about 800 psia.

In step (a), a screw design is selected to provide mixing, melting, and pressurizing prior to the vacuum zone. In the vacuum zone, screw design, while using standard elements, preferably includes deep groove conveying elements for reducing melt pressure. In the event that a continuous melt/mixer is used, it is preferred that a continuous feeding system is also used.

With regard to adding the granular blowing agent in step (a)(i) directly or via a masterbatch to the polymer prior to the introduction of the polymer into the melting zone, a mixture of the full amount of blowing agent and resin with or without other additives or a masterbatch of these components is prepared in a conventional manner usually by dry mixing. The full amount is then introduced into feed zone of the melter/mixer while the masterbatch is, first mixed with the full amount of resin and then that mixture is added to the feed zone.

In step (a) (ii), gaseous blowing agents are used. Examples of gaseous blowing agents are inert gases such as nitrogen, argon, helium, neon, and carbon dioxide. Various techniques and apparatus for introducing a gaseous blowing agent to the mixing zone are described in U. S. Pat. Nos. 3,975,473; 4,169,679;and 4,302,409. These patents make their injection into a mixer head positioned at the end of the extruder screw, i. e. , the downstream end of the screw; the blowing agent mixes at that point with the resin melt; and goes through the breaker plate to the die. In the present invention, however, it is preferred that the injection of blowing agent is made into the barrel at the upstream end of the mixing zone, particularly before the vacuum zone. The number of mixing elements is determined with respect to residence time and screw length. Generally, the number of mixing elements is in the range of 1 to 5 and the residence time is in the range of about 20 to about 60 seconds.

In step (a)(ii),the injection of the gaseous blowing agent can be made through a porous screw element. This is another preferred mode of operation. The porous elements have a number of openings with very small diameters. These openings, which can be referred to as capillary channels, provide delivery of blowing agent directly to the mixing zone. In order to provide for this passage, pressure of the gaseous blowing agent, as noted above, preferably exceeds the melt pressure in the mixing zone by about 20 to about 50 percent.

In step (b), the polymer is melted in the melting zone. The temperature of the melting zone is maintained at or above the melting point of the polymer, which is generally in the range of about 105 to about 270 degrees C.

In step (c), the molten polymer is mixed with the blowing agent in the mixing zone under a pressure of about 150 to about 4000 psia, and preferably a pressure of about 300 to about 800 psia.

In step (d), the temperature is sufficient to decompose the granular blowing agent in the mixing zone and/or in the reduced pressure zone, or expand the gaseous blowing agent in the reduced pressure zone. Generally, the temperature is in the range of about 120 to about 270 degrees C. Here, the blowing agent in its decomposed or expanded state develops froth cells in the molten polymer. The froth cells are believed to encapsulate the gaseous impurities. The term "froth cell", for the purposes of this specification, means a thin wall cover of molten resin. It is similar to a bubble. The cell has common walls with adjacent cell. As noted, it is believed that within each wall cover are gaseous impurities.

In step (e), in the reduced pressure zone or vacuum zone, the pressure is reduced at the surface of the molten polymer in a sufficient amount to remove essentially all of the gaseous impurities probably through the thin walls of the froth cells, which are present in the molten polymer. This is accomplished by either the reduction in pressure or by actually vacuuming the surface. Generally, the pressure is reduced down to at least 0.1 psia or less. In this step, the froth cells are collapsed, and the molten polymer returns to its original unfoamed state. The term "essentially all" in step (e) means that a sufficient amount of the gaseous impurities are removed to make the polymer commercially acceptable, i. e. , at least about 80 or 90 percent by weight or more.

In step (f), the optional instruction is given to repeat steps (c),(d), and (e) at least once, and preferably 2 to about 4 times. It is noted that the repetition of steps generally takes place along the length of the extruder, preferably along the screw.

The polymer is then recovered in step (g) in an essentially unfoamed state. Thus, the process of this invention is not to be confused with foaming processes, the objective of which is to provide cellular or foamed resins.

After, the resin is recovered it is preferably pelletized, but can also be extruded directly into an end product.

Various conventional additives can be added to the resin prior to or during the mixing of the components, and prior to or during extrusion. The additives include antioxidants, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, flame retardant fillers and additives, crosslinking boosters and catalysts, and smoke suppressants. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis [methylene(3,5-di-tert-butyl-4-hydroxyhydrocinnamate)]-methane, bis[(beta-(3,5-di-tert-butyl-4-hydroxybenzyl)-methylcarboxyethyl)]sulphide, 4,4-thiobis(2-methyl-6-tert-butylphenol), 4,4-thiobis (2-tert-butyl-5-methylphenol), 2,2-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of resin.

The advantages of the invention lie in the removal of detrimental impurities from resins, which, sans impurities, find use in wire and cable, food containers, and medical supply packaging. An advantage also lies in finding a relatively simple process which uses conventional apparatus.

The patents mentioned in this specification are incorporated by reference herein.

The invention is illustrated by the following examples.

EXAMPLE 1

Three runs are carried out on a ZSK™ 30 twin screw extruder equipped with a pelletizer. The objective is to deodorize recycled high density polyethylene (HDPE). Limonene is responsible for the odor. It is present in the HDPE in an amount of 50.25 ppb (parts per billion). The HDPE is pre-blended with a granular blowing agent, azodicarbonamide, in an amount of 2.66 percent by weight and a blowing agent activator, zinc oxide, in an amount of 0.027 percent by weight, the percents by weight being based on the weight of the HDPE.

In the first two runs, a feeder delivers the blend to the hopper of the extruder. There is an alternative feeder for use with a masterbatch, which is used in the third run. The masterbatch composition comprises, by weight, 83.2 percent HDPE, 16.6 percent blowing agent, and 0.17 percent blowing agent activator. The HDPE/masterbatch blend, by weight, is 84 percent HDPE and 16 percent masterbatch.

The extruder has 11 barrels. The hopper is positioned at the first feeding barrel. The first, second, and third vacuum ports are positioned at the $4^{th}$, $8^{th}$, and $10^{th}$ barrels, respectively. A vacuum system provides separate vacuuming for each of the vacuum ports. The first section of the screw design provides feeding, melting, and mixing. Where pressure/depressurization is used, the next section of the screw design provides pressure of 400 psia and the next section of the screw design reduces the pressure to about zero psia, i. e. , below atmospheric pressure. The melt temperature in the extruder is 250 degrees C. Foaming (frothing) of the melt takes place in the pressure/depressurization zones.

Vacuuming (pressure/depressurization) and blowing agent are not used in the first run, but vacuuming is used in the second and third runs. Blowing agent is not used in the second run, but is used in the third run. In addition to the removal of impurities, the foam is essentially removed by vacuuming. This is analogous to deflating the froth cells.

The limonene content, after the first run, is 38.77 ppb (parts per billion); after the second run is 7.20 ppb; and after the third run, 0.09 ppb.

EXAMPLE 2

The second run of example 1 is repeated using a single screw extruder having an upstream mixing element. A gaseous blowing agent is used instead of the granular blowing agent and blowing agent activator. The mixing element is positioned at the end of the melting zone. It has a plurality of longitudinal external groove means open in the upstream direction and closed in the downstream direction. The molten resin is divided into a plurality of parallel flow streams, which pass into the plurality of longitudinal external groove means. The longitudinal external groove means are formed between longitudinal land pairs. A gaseous blowing agent, nitrogen, is introduced into barrel 4 through an inlet port, which is positioned to inject the gas into the plurality of longitudinal external groove means. It is injected under a pressure of 800 psia. The mixing element lands in this region are in close proximity to, but clear of, the inner walls of the extruder barrel. The rotation of the screw causes the lands to constantly sweep the gaseous blowing agent inlet port and intermittently open and close the passage of gas under substantially full inlet pressure to the parallel molten resin streams passing through the plurality of longitudinal external groove means. In this manner (under reduced pressure), a foam is formed in the melt, and the melt is then further depressurized in the vacuum zone. The results are similar to the third run in example 1.

EXAMPLE 3

Example 2 is repeated except that the gaseous blowing agent is injected into the melt through a porous conveying block that is installed upstream of the mixing and depressurization zones. It is introduced under a pressure of 1000 psia. The resin melt is saturated with the gaseous blowing agent as it passes through the mixing zone, and a foam is formed in the melt in the depressurization zone. The results are similar to example 2.

Note: the number and length of mixing and vacuuming zones is selected according to the properties of the volatile impurities.

We claim:

1. A process for the devolatilization of a thermoplastic polymer containing gaseous impurities in an apparatus having a melting zone, a mixing zone, and a reduced pressure zone, comprising:

(a) adding a gaseous blowing agent to the mixing zone;
   (b) melting the polymer in the melting zone;
   (c) mixing the molten polymer and blowing agent in the mixing zone under sufficient pressure to maintain the blowing agent in the mixture;
   (d) at a temperature sufficient for expansion, expanding the gaseous blowing agent in the reduced pressure zone wherein the blowing agent in its expanded state develops froth cells in the molten polymer;
   (e) in the reduced pressure zone, reducing the pressure at the surface of the molten polymer in a sufficient amount to remove essentially all of the gaseous impurities;
   (f) optionally, repeating steps (c), (d), and (e) at least once; and
   (g) recovering the polymer in an essentially unfoamed state.

2. The process defined in claim 1 wherein step (a) is carried out by adding a gaseous blowing agent to the mixing zone through a porous element.

3. The process defined in claim 1 wherein, in step (c), the pressure is in the range of about 300 to about 800 psia.

4. The process defined in claim 1 wherein, in step (e), the pressure is reduced to at least 0.1 psia or less.

5. The process defined in claim 1 wherein, in step (f), steps (c), (d), and (e) are repeated at least once.

6. A process for the devolatilization of a thermoplastic polymer containing gaseous impurities in an apparatus having a melting zone, a mixing zone, and a reduced pressure zone, comprising (a) adding a gaseous blowing agent, nitrogen, to the mixing zone at a pressure in the range of about 20 to about 50 percent above the melt pressure
   (b) melting the polymer in the melting zone;
   (c) mixing the molten polymer and blowing agent in the mixing zone under a pressure of about 300 to about 500 psia
   (d) at a temperature sufficient for expansion, about 120 to about 270 degrees C., expanding the gaseous blowing agent in the reduced pressure zone wherein the blowing agent in its expanded state develops froth cells in the molten polymer;
   (e) in the reduced pressure zone, reducing the pressure at the surface of the molten polymer to 0.1 psia or less to remove essentially all of the gaseous impurities;
   (f) repeating steps (c), (d), and (e), 2 to 4 times; and
   (g) recovering the polymer in an essentially unfoamed state.

* * * * *